United States Patent
Zhuang et al.

(10) Patent No.: US 9,324,252 B2
(45) Date of Patent: Apr. 26, 2016

(54) WIRING STRUCTURE OF WIRING AREA ON LIQUID CRYSTAL DISPLAYING PANEL AND TESTING METHOD OF LIQUID CRYSTAL DISPLAYING PANEL

(75) Inventors: Yizhuang Zhuang, Guangdong (CN); Jungmao Tsai, Guangdong (CN); Shiue-shih Liao, Guangdong (CN); Songxian Wen, Guangdong (CN); Mingfeng Deng, Guangdong (CN); JunJie Huang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 930 days.

(21) Appl. No.: 13/578,438

(22) PCT Filed: May 28, 2012

(86) PCT No.: PCT/CN2012/076143
§ 371 (c)(1),
(2), (4) Date: Aug. 10, 2012

(87) PCT Pub. No.: WO2013/155757
PCT Pub. Date: Oct. 24, 2013

(65) Prior Publication Data
US 2013/0271168 A1    Oct. 17, 2013

(30) Foreign Application Priority Data
Apr. 16, 2012   (CN) .......................... 2012 1 0111153

(51) Int. Cl.
*G09G 3/00* (2006.01)
*G02F 1/1362* (2006.01)

(52) U.S. Cl.
CPC .... *G09G 3/006* (2013.01); *G02F 2001/136254* (2013.01)

(58) Field of Classification Search
CPC .......................................... G02F 2001/136254
IPC ...................... G02F 2001/136254; G09G 3/006
See application file for complete search history.

(56) References Cited

U.S. PATENT DOCUMENTS

| | | | | |
|---|---|---|---|---|
| 2008/0123012 A1* | 5/2008 | Ohtomo | ............... | G02F 1/1368 349/54 |
| 2008/0278428 A1* | 11/2008 | Song | .................... | G09G 3/3696 345/98 |
| 2010/0127258 A1* | 5/2010 | Kang | .................. | G02F 1/13458 257/48 |

FOREIGN PATENT DOCUMENTS

| | | |
|---|---|---|
| CN | 102109688 A | 6/2011 |
| CN | 102237027 A | 11/2011 |

OTHER PUBLICATIONS

Office action dated Jan. 2014 in corresponding CN application No. 201210111153.4 (in Chinese).

*Primary Examiner* — Edward Glick
*Assistant Examiner* — Alexander Gross

(57) ABSTRACT

A wiring structure of a wiring area on a liquid crystal displaying panel includes a number of wiring lines connected to one end of a corresponding data line and corresponding scan line on the wiring area, at least one signal testing point, a number of first testing lines connected between the wiring lines and the signal testing point, a number of second testing lines connected between the signal testing point and the other end of the corresponding data line and the corresponding scan line, and a switch controlling circuit connected to the second testing lines. After the testing lines are disconnected from the wiring lines in the previous process, the testing signal still can be transmitted through the other end of the corresponding data line or the scan line, to implement the image test of the liquid crystal displaying panel.

13 Claims, 2 Drawing Sheets

WIRING STRUCTURE OF WIRING AREA ON LIQUID CRYSTAL DISPLAYING PANEL AND TESTING METHOD OF LIQUID CRYSTAL DISPLAYING PANEL

This is a National Phase Application filed under 35 U.S.C. 371 as a national stage of PCT/CN2010/076143, filed May 28, 2012, an application claiming the benefit under 35 USC 119(e) Chinese Application No. 201210111153.4, filed Apr. 16, 2012, the content of each of which is hereby incorporated by reference in its entirety.

BACKGROUND

1. Technical Field

The present disclosure relates to liquid crystal displaying technologies, and particularly, to a wiring structure of a wiring area on a liquid crystal displaying panel and a testing method of the liquid crystal displaying panel.

2. Description of Related Art

A conventional liquid crystal display (LCD) equipment mainly includes a liquid crystal displaying panel and a backlight module. Referring to FIG. 1, the liquid crystal displaying panel includes a display area 1 and a wiring area 2 adjacent to the display area 1. The display area 1 includes a number of data lines and gate lines. The wiring area 2 includes a number of wiring lines 3 connected to each data line and gate line, and testing lines 4 connected to the wiring lines 3.

In celling process of the LCD, when images shown in a liquid crystal displaying panel are being tested, an image testing apparatus outputs testing signals from signal testing points 5 to the display area 1 through the testing lines 4 and the wiring lines 3. After the image testing apparatus finishes testing the liquid crystal displaying panel, a laser cutting machine cuts off a connecting portion 6 between the testing lines 4 and the wiring lines 3. Then the liquid crystal displaying panel can be supplied to the subsequent moduling process.

During moduling process, a chip-on-film (COF) is attached to a pad of each of the wiring lines 3 for supplying a signal. During moduling process, it is also necessary to test images shown in the liquid crystal displaying panel. When the liquid crystal displaying panel is tested to be unqualified, it is supposed to figure out the reason for the unqualified product during the moduling process or the celling process, in which the COF needs to be removed to allow the image shown in the liquid crystal displaying panel to be tested again by the testing apparatus. But the connecting portion 6 between the testing lines 4 and the wiring lines 3 has been cut off by the laser cutting machine during the celling process, therefore the apparatus in the celling process can not be applied to test the liquid crystal displaying panel again, which brings difficulty to figure out the reason causing the unqualified products.

Furthermore, during reliability assurance (RA) testing, there is a possibility that the image test can not be implemented during the celling process.

SUMMARY

One object of the present disclosure is to provide a wiring structure of a wiring area on a liquid crystal displaying panel. The wiring structure includes a number of wiring lines respectively connected to one end of a corresponding data line and corresponding scan line on the wiring area, at least one signal testing point, configured to receive testing signal for testing a liquid crystal displaying panel with the wiring structure, a number of first testing lines connected between the wiring lines and the at least one signal testing point, a number of second testing lines connected between the at least one signal testing point and the other end of each data line and scan line, and a switch controlling circuit connected to the second testing lines, configured to control the path of the testing signal from the signal testing point to the display area of the liquid crystal displaying panel.

Preferably, the switch controlling circuit includes electronic switches connected between the second testing lines and the corresponding data lines or scan lines, and a controlling signal input point for turning on and off the electronic switches, the controlling signal input point is connected to the electronic switches via a switch controlling bus; when the first testing lines are connected to the wiring lines, the controlling signal input point receives a low-level signal for turning off the corresponding electronic switches, the testing signal is transmitted through the signal testing point, the first testing lines, the corresponding wiring line, and one end of the corresponding data line or corresponding scan line in that order to the display area; when the first testing lines are disconnected from the wiring lines, the controlling signal input point receives a high-level signal for turning on the corresponding electronic switch, the testing signal is input from the signal testing point, and transmitted through the second testing lines, the corresponding electronic switch, and the other end of the corresponding data line or scan line in that order to the display area.

Preferably, the electronic switches are thin film transistors (TFTs), the gate of each of the TFTs is connected to the switch controlling bus, the drain thereof is connected to the corresponding data line, and the source thereof is connected to the second testing line.

Preferably, each of the electronic switches connected to the second testing line is simultaneously formed with the TFT.

Preferably, a chip-on-film is attached to the pad of each of the wiring lines.

Preferably, each signal testing point includes a first signal testing point and a second signal testing point, one end of the first signal testing point is connected to the wiring line of the corresponding data line through the first testing line of the data line, and the other end thereof is connected to the other end of the data line through the second testing line of the data line; one end of the second signal testing point is connected to the wiring line of the corresponding scan line through the first testing line of the scan line, and the other end thereof is connected to the other end of the scan line through the second testing line of the scan line.

The present disclosure further provides a testing method of a liquid crystal displaying panel using the wiring structure, includes:

receiving a high-level signal or a low-level signal corresponding to the connecting state between the wiring lines and the first testing lines;

controlling the path of the testing signal received by the controlling signal input point of entering into the display area on the liquid crystal displaying panel.

Preferably, the step of receiving a high-level signal or a low-level signal corresponding to the connecting state between the wiring lines and the first testing lines includes:

when the wiring lines are connected to the first testing lines, controlling the signal input point to receive a low-level signal;

when the wiring lines are disconnected from the first testing lines, controlling the signal input point to receive a high-level signal.

Preferably, the step of controlling the path of the testing signal received by the controlling signal input point of entering into the display area on the display panel includes:

when the controlling signal input point receives the low-level signal, turning off the electronic switch connected to the second testing lines, and transmitting the testing signal through the signal testing point, the first testing lines, the wiring lines, and one end of the corresponding data line or corresponding scan line in that order to the display area;

when the controlling signal input point receives the high-level signal, turning on the electronic switch connected to the second testing lines, and transmitting the testing signal through the signal testing point, the second testing lines, the electronic switch, and one end of the corresponding data line or scan line in that order to the display area.

Preferably, the electronic switches are TFTs, the gate of the TFT is connected to the switch controlling bus, the drain thereof is connected to the corresponding data line, and the source thereof is connected to the second testing line.

In the wiring structure of a wiring area on a liquid crystal displaying panel and a testing method of the liquid crystal displaying panel of the present disclosure, the second testing lines are connected to the other end of the corresponding scan line which has one end connected to the corresponding wiring line, and are connected to the other end of the corresponding data line which has one end connected to the corresponding wiring line. The wiring structure further forms a switch controlling circuit capable of controlling the path of the testing signal from the signal testing points to the display area. Thereafter, although the first testing lines are disconnected from the corresponding wiring lines, the testing signal from the signal testing points still can be transmitted through the other end of the corresponding data line or the scan line, to implement the image test of the liquid crystal displaying panel. Obviously, the wiring structure in this embodiment can avoid the problem of finding reasons for unqualified products by the image testing apparatus again as soon as the testing lines are disconnected from the wiring lines, which brings large help to analysis and test of the product. Furthermore, the new testing circuit shares the same signal testing points with the original testing circuit, which makes the testing apparatus keep its original structure, it is easier to satisfy, and also reduce cost.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

The main solution in the embodiment is: the wiring structure forms the second testing lines connected to the other end of the scan line which has one end connected to the corresponding wiring line, and the second testing lines connected to the other end of the data line which has one end connected to the corresponding wiring line. The wiring structure further forms a switch controlling circuit for controlling the path of the testing signal from the signal testing points to the display area. Thereafter, although the first testing lines are disconnected from the corresponding wiring lines, the testing signal from the signal testing points still can be transmitted through the other end of the corresponding data line or the scan line, to implement the image test of the liquid crystal displaying panel.

Figure 1:
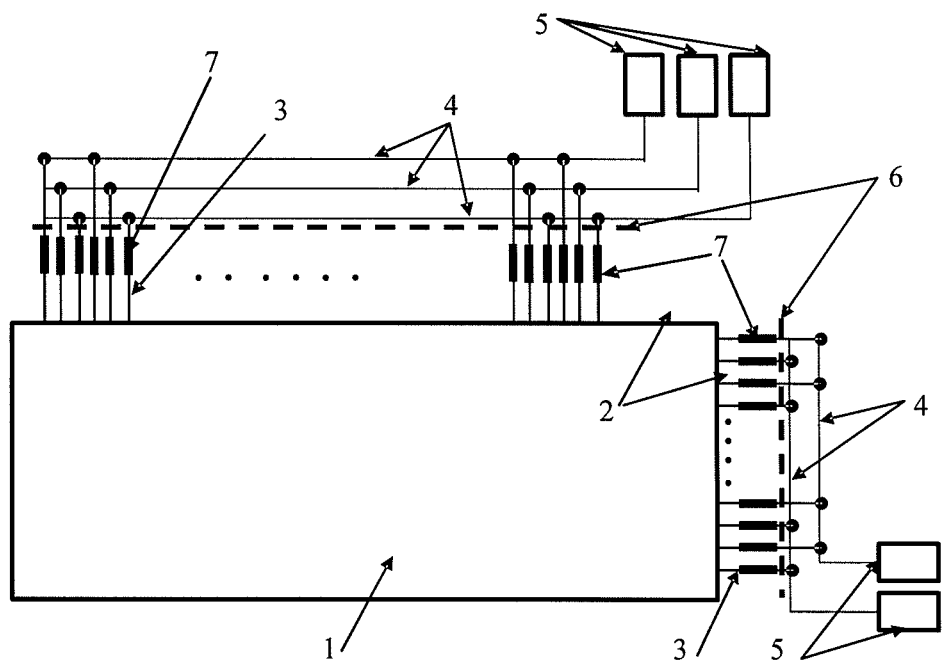
FIG. 1 is a schematic view of a conventional wiring structure of a wiring area on a present liquid crystal displaying panel.
Figure 2:
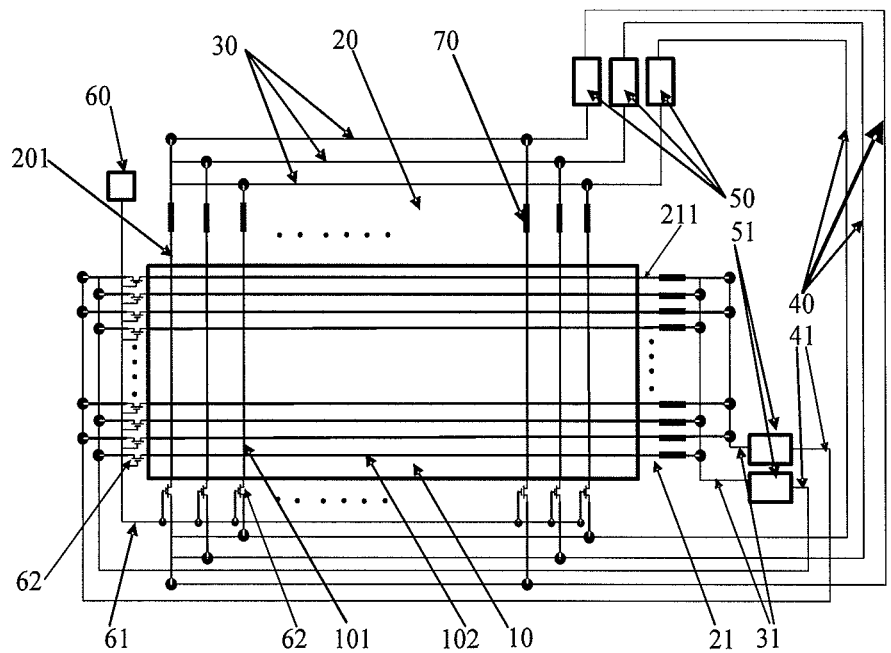
FIG. 2 is a schematic view of a wiring structure of a wiring area on a liquid crystal displaying panel in accordance with an embodiment of the present disclosure.

Referring to FIG. 2, a wiring structure of a wiring area on a liquid crystal displaying panel in an embodiment is shown. The liquid crystal displaying panel which contains the wiring area includes a display area 10 and a wiring area adjacent to the display area 10. The display area 10 includes a number of data lines 101 and a number of scan lines 102. The wiring area includes a data line wiring area 20 corresponding to the data lines 101 and a scan line wiring area 21 corresponding to the scan lines 102. The data line wiring area 20 includes a number of wiring lines 201 each which is connected to one end of the corresponding data line 101, and the scan line wiring area 21 includes a number of wiring lines 211 each which is connected to one end of the corresponding scan line 102. A COF for supplying signal is attached to a pad 70 of each of the wiring lines 201, 211.

Specifically, in the embodiment, the wiring structure of the wiring area includes the wiring lines 201, 211, signal testing points 50, 51, first testing lines 30, 31, second testing lines 40, 41, and a switch controlling circuit. The wiring lines 201, the signal testing points 50, the first testing lines 30, and the second testing lines 40 are disposed corresponding to the data lines 101. The wiring lines 211, the signal testing points 51, the first testing lines 31, and the second testing lines 41 are disposed corresponding to the scan lines 102.

The signal testing points 50, 51 are used for receiving testing signals for testing the liquid crystal displaying panel.

One end of each of the data lines 101 is connected to the corresponding first testing line 30 through the corresponding wiring line 201, and the other end thereof is connected to the second testing line 40. One end of each of the scan lines 102 is connected to the corresponding first testing line 31 through the corresponding wiring line 211, and the other end thereof is connected to the second testing line 41.

Specifically, one end of each of the first signal testing points 50 is connected to the corresponding wiring line 201 through the corresponding first testing line 30, and the other end thereof is connected to the other end of the corresponding data line 101 through the second testing line 40. One end of each of the second signal testing points 51 is connected to the corresponding wiring line 211 through the corresponding first testing line 31, and the other end thereof is connected to the other end of the corresponding scan line 102 through the second testing line 41 of the scan line 102.

The switch controlling circuit is connected to the second testing lines 40, 41 for controlling the path of the testing signals from the corresponding signal testing points 50, 51 to the display area 10 of the liquid crystal displaying panel.

In the embodiment, the switch controlling circuit includes an electronic switch 62, and a controlling signal input point 60. The electronic switch 62 is connected between the second testing line 40/41 and the corresponding data line 101 or the corresponding scan line 102. The signal input point 60 is connected to the electronic switch 62 via a switch controlling bus 61, for turning on and off the electronic switch 62.

When the first testing lines 30/31 are connected to the corresponding wiring lines 201/211, the controlling signal input point 60 receives a low-level signal for turning off the corresponding electronic switch 62. The testing signal is transmitted through the signal testing point 50/51, the first testing lines 30/31, the corresponding wiring line 201/211, and one end of the corresponding data line 101/scan line 102 in order to the display area 10 of the liquid crystal displaying panel, to drive the liquid crystal displaying panel to display images.

When the first testing lines 30/31 is disconnected from the corresponding wiring line 201/211, the controlling signal input point 60 receives a high-level signal for turning on the corresponding electronic switch 62. The testing signal is input from the signal testing point 50/51, and transmitted through the second testing lines 40/41, the corresponding electronic switch 62, and one end of the corresponding data line 101/scan line 102 in order to the display area 10 of the liquid crystal displaying panel, to drive the liquid crystal displaying panel to display images.

In the embodiment, the electronic switch 62 is a thin film transistor (TFT). The gate of the TFT is connected to the switch controlling bus 61, the drain thereof is connected to the corresponding data line 101/102, and the source thereof is connected to the corresponding second testing line 40/41.

As is mentioned before, a testing method of a liquid crystal displaying panel in the conventional technology includes the following steps: connecting each data line 101 or scan line 102 via certain testing lines, such as the first testing lines 30/31 in this embodiment; outputting testing signal to the TFT array of the liquid crystal displaying panel via the testing lines; and cutting off the connections between the testing lines and each signal line by laser after the images on the liquid crystal displaying panel are tested. Therefore, the following assembly of the drive circuit can be implemented.

In this embodiment, during the celling process, after an image testing apparatus finishes testing the images on the liquid crystal displaying panel, the connections between the first testing lines 30, 31 and the wiring lines are also cut off. When testing the images in the following moduling process, if a liquid crystal displaying panel is tested to be unqualified, the images need to be tested again in the image testing apparatus in the celling process for figuring out the reason for the unqualified product. The signal testing points 50, 51 still can retest the circuit via a standby conductive path, a peripheral electronic switch 62, and the controlling signal input point 60. The peripheral electronic switch 62 and switches on the display area 10 can be simultaneously formed with the TFT.

When the images are being tested during celling process, the controlling signal input point 60 inputs a low-level DC signal to turn off the electronic switch 62. The testing signal is input from the signal testing point 50/51, and transmitted through the first testing lines 30/31 to the display area 10, to drive the liquid crystal displaying panel to display images, and thereafter the liquid crystal displaying panel can be tested.

After the image testing apparatus finishes testing the images during the celling process, the connections between the first testing lines 30/31 and the corresponding wiring line 201/211 are cut off. When testing the image shown on the liquid crystal displaying panel during the following moduling process, if a liquid crystal displaying panel is tested to be unqualified, it is supposed to test the liquid crystal displaying panel again in the image testing apparatus. The controlling signal input point 60 is applied to input a high-level DC signal to turn on the electronic switches 62. The testing signal is input from the signal testing point 50/51, and transmitted through the other end of the corresponding data line 101 or scan line 102, to the display area 10 of the LCD, to drive the liquid crystal displaying panel to display images, and thereafter the image test of the liquid crystal displaying panel can also be implemented.

When there is no need to test the product after the moduling process, a low-level DC signal is applied to the controlling signal input point 60 to turn off the electronic switch 62. Thus, the circuit of the second testing lines 40/41 connected to the other end of the data lines 101 or the scan line 102 is not in use.

In this embodiment, the second testing lines 40 are connected to the other end of each of the scan lines 102 which is away from the corresponding wiring line 211, and the second testing lines 41 are connected to the other end of each of the corresponding data line 101, and the switch controlling circuit is capable of controlling the path of the testing signal from the signal testing points 50/51 to the display area 10. Therefore, although the first testing lines 30/31 is disconnected from the corresponding wiring lines 201/211, the testing signal from the signal testing points 50/51 still can be transmitted through the other end of the corresponding data line 101 or the scan line 102, to implement the image test of the liquid crystal displaying panel. Obviously, the wiring structure in this embodiment can avoid the problem of figuring out reasons for unqualified products by the image testing apparatus again as soon as the testing lines are disconnected from the wiring lines, which brings large help to analysis and test of the product. Furthermore, the new testing circuit shares the same signal testing points 50/51 with the original testing circuit, which allows the testing apparatus to keep its original structure, it is easier to satisfy, and also reduce cost.

Figure 3:
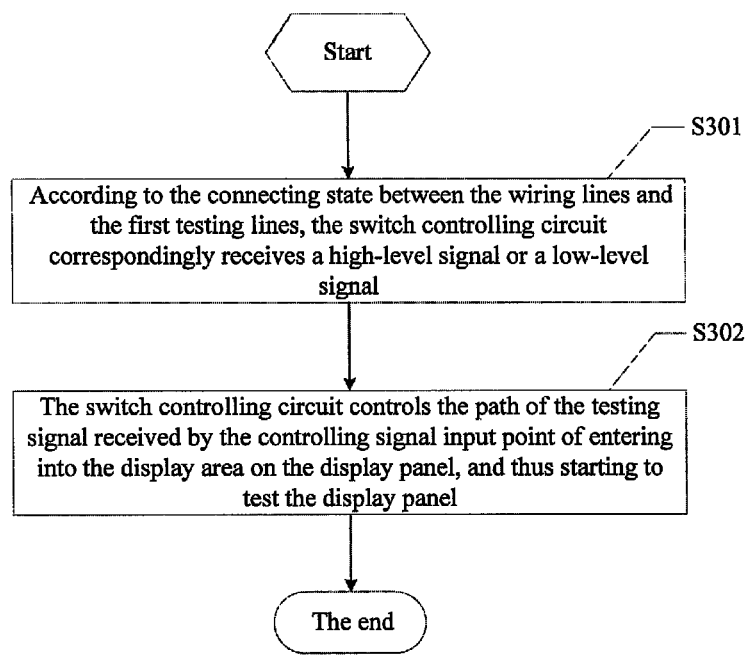
FIG. 3 is a flowchart of a testing method of the liquid crystal displaying panel shown in FIG. 2.

FIG. 3 is flowchart of a testing method of a liquid crystal displaying panel in an embodiment using the wiring structure of a wiring area on a liquid crystal displaying panel. The testing method includes the following steps:

Step S101, according to the connecting state between the wiring lines and the first testing lines, the switch controlling circuit correspondingly receives a high-level signal or a low-level signal. Specifically, when the wiring lines are connected to the first testing lines, the controlling signal input point receives a low-level signal; and when the wiring lines are disconnected from the first testing lines, the controlling signal input point receives a high-level signal.

Step S102, the switch controlling circuit controls the path of the testing signal received by the controlling signal input point of entering into the display area on the display panel, and thus starting to test the display panel. Specifically, when the controlling signal input point receives a low-level signal, the controlling circuit turns off the electronic switches of the second testing lines, thus, the testing signal is transmitted through the signal testing point, the corresponding wiring line, and one end of the corresponding data line or the corresponding scan line in order to the display area; when the controlling signal input point receives a high-level signal, the controlling circuit turns on the electronic switches, thus, the testing signal is transmitted through the signal testing point, the second testing lines, the corresponding electronic switch, and one end of the corresponding data lines or the scan lines in order to the display area.

All the above-mentioned electronic switches are TFTs. The gate of each of the TFTs is connected to the switch controlling bus, the drain thereof is connected to the corresponding data line, and the source thereof is connected to the corresponding second testing line.

As it is mentioned before, in the conventional technology, a frequently-used testing method of a liquid crystal displaying panel includes the following steps: connecting each data line or scan line via certain testing lines, such as the first testing lines in this embodiment; outputting testing signal to the TFT array of the liquid crystal displaying panel via the testing lines; cutting off the connections between the testing lines and the signal lines by laser after the test is finished.

In this embodiment, during the celling process, after the test is finished, the connections between the first testing lines and the wiring lines are also cut off. When the image shown on the liquid crystal displaying panel is being tested during the following moduling process, if a liquid crystal displaying panel is tested to be unqualified, it is supposed to test the liquid crystal displaying panel again in the celling process for figuring out the reason for the unqualified product. The signal testing points can still be used to test the lines via a standby conductive path, a peripheral electronic switches, and controlling signal input point, in which the peripheral electronic switch and the display area can be simultaneously formed.

When the image is being tested in the celling process, the controlling signal input point inputs a low-level DC signal to turn off the electronic switch. The testing signal is input from the signal testing point, and transmitted through the first testing lines to the display area for driving the liquid crystal displaying panel to display images, thus, the liquid crystal displaying panel can be tested.

After the image testing apparatus finishes testing the image in the celling process, the connections between the first testing lines and the corresponding wiring line are cut off. When the image shown on the liquid crystal displaying panel is tested during the following moduling process, if a liquid crystal displaying panel is tested to be unqualified, it is supposed to test the liquid crystal displaying panel again in the celling process. At this time, a high-level DC signal is inputted via the controlling signal input point for turning on the electronic switches. The testing signal is input from the signal testing point, and transmitted through the other end of the corresponding data line or scan line, to the display area 10 of the LCD, to drive the liquid crystal displaying panel to display images, and thereafter the image test of the liquid crystal displaying panel can also be implemented.

When there is no need to test the product after the moduling process, a low-level DC signal is inputted via the controlling signal input point for turning off the electronic switch. The circuit of the second testing lines connected to the other end of the data lines 101 or the scan line is not in use.

In the wiring structure of the wiring area of the liquid crystal panel and the testing method of the liquid crystal panel of the present disclosure, the second testing lines 41 are connected to the other end of the corresponding scan line 102 which is away from the corresponding wiring line 211, and are connected to the other end of each of the corresponding data line 101 which is way from the corresponding wiring line 201. The wiring structure further provides the switch controlling circuit capable of controlling the path of the testing signal from the signal testing points 50/51 to the display area 10. Therefore, although the first testing lines are disconnected from the corresponding wiring lines, the testing signal from the signal testing points still can be transmitted through the other end of the corresponding data line or the scan line, to implement the image test of the liquid crystal displaying panel. Obviously, the wiring structure in this embodiment can avoid the problem of figuring out reasons for unqualified products by the image testing apparatus again as soon as the testing lines are disconnected from the wiring lines, which brings large help to analysis and test of the product. Furthermore, the new testing circuit shares the same signal testing points with the original testing circuit, which makes the testing apparatus keep its original structure, it is easier to satisfy, and also reduce cost.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A wiring structure of a wiring area on a liquid crystal displaying panel, comprising:
    a plurality of wiring lines respectively connected to one end of a corresponding data line and one end of a corresponding scan line;
    at least one signal testing point, configured to receive at least one testing signal for testing the liquid crystal displaying panel;
    a plurality of first testing lines connected between the wiring lines and the at least one signal testing point;
    a plurality of second testing lines connected between the at least one signal testing point and the other end of the corresponding data line and the corresponding scan line; and
    a switch controlling circuit connected to the second testing lines, configured to control the path of the at least one testing signal from the at least one signal testing point to the display area of the liquid crystal displaying panel;
    wherein each signal testing point comprises a first signal testing point and a second signal testing point, one end of the first signal testing point is connected to the wiring line of the corresponding data line through the first testing line, and the other end thereof is connected to the other end of the corresponding data line through the second testing line, one end of the second signal testing point is connected to the wiring line of the corresponding scan line through the first testing line, and the other end thereof is connected to the other end of the corresponding scan line through the second testing line;
    wherein the switch controlling circuit comprises electronic switches connected between the second testing lines and the data lines or scan lines, and a controlling signal input point for turning on and off the electronic switches, the controlling signal input point is connected to the electronic switches via a switch controlling bus; when the first testing lines are connected to the wiring lines, the controlling signal input point receives a low-level signal for turning off the corresponding electronic switches, the testing signal is transmitted through the signal testing point, the first testing lines, the corresponding wiring line, and one end of the corresponding data line or scan line in that order to the display area; when the first testing lines are disconnected from the wiring lines, the controlling signal input point receives a high-level signal for turning on the corresponding electronic switch, the testing signal is input from the signal testing point, and transmitted through the second testing lines, the corresponding electronic switch, and the other end of the corresponding data line or scan line in that order to the display area.

2. The wiring structure as claimed in claim 1, wherein the electronic switches are thin film transistors, the gate of each of the thin film transistors is connected to the switch controlling bus, the drain thereof is connected to the corresponding data line, and the source thereof is connected to the second testing line.

3. The wiring structure as claimed in claim 1, wherein each of the electronic switches connected to the second testing line is simultaneously formed with the thin film transistors.

4. The wiring structure as claimed in claim 1, wherein a chip-on-film is attached to the pad of each of the wiring lines.

5. A wiring structure of a wiring area on a liquid crystal displaying panel, comprising:
  a plurality of wiring lines respectively connected to one end of a corresponding data line and a corresponding scan line on the wiring area;
  at least one signal testing point, configured to receive at least one testing signal for testing a liquid crystal displaying panel with the wiring structure;
  a plurality of first testing lines connected between the wiring lines and the at least one signal testing point;
  a plurality of second testing lines connected between the at least one signal testing point and the other end of the corresponding data line and the corresponding scan line; and
  a switch controlling circuit connected to the second testing lines, configured to control the path of the testing signal from the signal testing point to the display area of the liquid crystal displaying panel;
  wherein the switch controlling circuit comprises electronic switches connected between the second testing lines and the corresponding data line or corresponding scan line, and a controlling signal input point for turning on and off the electronic switches, the controlling signal input point is connected to the electronic switches via a switch controlling bus; when the first testing lines are connected to the wiring lines, the controlling signal input point receives a low-level signal for turning off the corresponding electronic switches, the testing signal is transmitted through the signal testing point, the first testing lines, the corresponding wiring line, and one end of the corresponding data line or corresponding scan line in that order to the display area; when the first testing lines are disconnected from the wiring lines, the controlling signal input point receives a high-level signal for turning on the corresponding electronic switch, the testing signal is input from the signal testing point, and transmitted through the second testing lines, the corresponding electronic switch, and the other end of the corresponding data line or scan line in that order to the display area.

6. The wiring structure as claimed in claim 5, wherein the electronic switches are thin film transistors, the gate of each of the thin film transistors is connected to the switch controlling bus, the drain thereof is connected to the corresponding data line, and the source thereof is connected to the second testing line.

7. The wiring structure as claimed in claim 5, wherein each of the electronic switches connected to the second testing line is simultaneously formed with the thin film transistors.

8. The wiring structure as claimed in claim 5, wherein a chip-on-film is attached to the pad of each of the wiring lines.

9. A testing method of a liquid crystal displaying panel using the wiring structure of a wiring area in claim 5, comprising:
  controlling the switch controlling circuit to receive a high-level signal or a low-level signal corresponding to the connecting state between the wiring lines and the first testing lines;
  controlling the path of the testing signal received by the controlling signal input of entering into the display area on the display panel;
  wherein the step of controlling the switching controlling circuit to receive a high-level signal or a low-level signal corresponding to the connecting state between the wiring lines and the first testing lines comprises:
  controlling the signal input point to receive a low-level signal when the wiring lines are connected to the first testing lines;
  controlling the signal input point to receive a high-level signal when the wiring lines are disconnected from the first testing lines.

10. The testing method as claimed in claim 9, wherein the step of controlling the path of the testing signal received by the controlling signal input point of entering into the display area on the display panel comprises:
  when the controlling signal input point receives the low-level signal, turning off the electronic switch connected to the second testing lines, and transmitting the testing signal through the signal testing point, the first testing lines, the wiring lines, and one end of the corresponding data line or corresponding scan line in that order to the display area;
  when the controlling signal input point receives the high-level signal, turning on the electronic switch connected to the second testing lines, and transmitting the testing signal through the signal testing point, the second testing lines, the electronic switch, and one end of the corresponding data line or corresponding scan line in that order to the display area.

11. The testing method as claimed in claim 10, wherein the electronic switches are thin film transistors, the gate of each of the thin film transistors is connected to the switch controlling bus, the drain thereof is connected to the corresponding data line or the corresponding scan line, and the source thereof is connected to the second testing line.

12. The testing method as claimed in claim 11, wherein each of the electronic switches connected to the second testing line is simultaneously formed with the thin film transistors.

13. The testing method as claimed in claim 9, wherein a chip-on-film is attached to the pad of each of the wiring lines.

* * * * *